(12) United States Patent
de Souza et al.

(10) Patent No.: US 9,652,432 B2
(45) Date of Patent: May 16, 2017

(54) EFFICIENT AND SCALABLE SYSTEM AND COMPUTER PROGRAM PRODUCT FOR HANDLING RX PACKET ON A MR-IOV ARRAY OF NICS

(71) Applicant: International Business Machines Corporation, Armonk, NY (US)

(72) Inventors: Kleber Sacilotto de Souza, Campinas (BR); Tiago Nunes dos Santos, Araraquara (BR); Rafael Camarda Silva Folco, Santa Barbara d'Oeste (BR); Breno Henrique Leitão, Guanabara Campinas (BR)

(73) Assignee: International Business Machines Corporation, Armonk, NY (US)

( * ) Notice: Subject to any disclaimer, the term of this patent is extended or adjusted under 35 U.S.C. 154(b) by 119 days.

(21) Appl. No.: 14/247,910

(22) Filed: Apr. 8, 2014

(65) Prior Publication Data
US 2015/0288587 A1    Oct. 8, 2015

(51) Int. Cl.
G06F 13/42    (2006.01)
G06F 1/32     (2006.01)
H04L 12/26    (2006.01)
H04L 12/911   (2013.01)

(52) U.S. Cl.
CPC ........ *G06F 13/4295* (2013.01); *G06F 1/3209* (2013.01); *G06F 1/3287* (2013.01); *H04L 43/0876* (2013.01); *H04L 43/0888* (2013.01); *H04L 43/16* (2013.01); *H04L 47/783* (2013.01);
(Continued)

(58) Field of Classification Search
CPC .. G06F 1/3209; G06F 1/3287; G06F 13/4295; H04L 43/0876; H04L 43/0888; H04L 43/16; H04L 47/783; Y02B 60/1228; Y02B 60/1235
See application file for complete search history.

(56) References Cited

U.S. PATENT DOCUMENTS 6,134,678 A     10/2000  Mahallingam et al.
6,314,525 B1 *  11/2001  Mahalingham ..... H04L 12/2856
                                              370/217
(Continued)

FOREIGN PATENT DOCUMENTS

CN    101350818 A    1/2009
CN    101383732 A    3/2009
(Continued)

OTHER PUBLICATIONS

"Junos OS Ethernet Interfaces Configuration Guide", Published Feb. 12, 2013, Juniper Networks, Inc.
(Continued)

*Primary Examiner* — Patrice Winder
(74) *Attorney, Agent, or Firm* — Scully, Scott, Murphy & Presser, P.C.

(57) ABSTRACT

There are provided a system and a computer program product for operating of network cards in computing systems. The computing systems detect resource utilization of all network cards of physical servers connected via one or more networks. The computing systems monitor network statistics of the network. The computing systems determine an operation of each network card connected to the network according to the monitored network statistics.

14 Claims, 12 Drawing Sheets

(52) U.S. Cl.
CPC ....... *Y02B 60/1228* (2013.01); *Y02B 60/1235* (2013.01)

(56) References Cited

U.S. PATENT DOCUMENTS

| | | | |
|---|---|---|---|
| 6,512,774 B1* | 1/2003 | Vepa | H04L 69/40 370/242 |
| 6,795,933 B2* | 9/2004 | Wachel | H04L 1/22 370/216 |
| 7,159,034 B1* | 1/2007 | Rai | H04L 29/12009 709/238 |
| 7,266,079 B2* | 9/2007 | Fan | H04L 47/11 370/230 |
| 7,463,595 B1* | 12/2008 | Singhal | G06F 13/385 370/254 |
| 7,693,045 B2* | 4/2010 | McGee | H04L 12/2697 370/216 |
| 7,783,784 B1* | 8/2010 | Droux | H04L 41/0803 370/358 |
| 7,788,411 B2* | 8/2010 | Belgaied | H04L 12/4679 709/226 |
| 7,899,848 B2* | 3/2011 | Yin | H04L 67/1008 707/797 |
| 7,907,528 B2 | 3/2011 | Liu et al. | |
| 7,934,033 B2 | 4/2011 | Malwankar et al. | |
| 7,995,465 B2 | 8/2011 | Abdulla et al. | |
| 8,265,075 B2 | 9/2012 | Pandey | |
| 8,271,604 B2* | 9/2012 | Freimuth | G06F 12/145 709/213 |
| 8,369,212 B2* | 2/2013 | Howard | H04L 41/0663 370/225 |
| 8,386,762 B2* | 2/2013 | Lee | G06F 9/4416 370/409 |
| 8,412,860 B2* | 4/2013 | Kishore | G06F 13/4022 710/64 |
| 8,503,468 B2 | 8/2013 | Akyol et al. | |
| 8,644,326 B2* | 2/2014 | Naven | H04L 47/32 370/412 |
| 8,677,023 B2* | 3/2014 | Venkataraghavan | H04L 67/1097 709/200 |
| 8,817,817 B2* | 8/2014 | Koenen | H04L 12/10 370/468 |
| 9,026,640 B2* | 5/2015 | Loboz | G06Q 10/06393 705/7.39 |
| 9,083,611 B2* | 7/2015 | Khare | H04L 41/0668 |
| 9,083,811 B2 | 7/2015 | Sharma et al. | |
| 9,170,976 B2* | 10/2015 | Folco | G06F 13/4295 |
| 9,280,504 B2 | 3/2016 | Ben-Michael et al. | |
| 2006/0227703 A1* | 10/2006 | Hung | H04L 43/0817 370/217 |
| 2008/0002714 A1 | 1/2008 | Belgaied et al. | |
| 2008/0304519 A1 | 12/2008 | Koenen et al. | |
| 2009/0276773 A1 | 11/2009 | Brown et al. | |
| 2009/0300209 A1* | 12/2009 | Elzur | H04L 47/10 709/234 |
| 2010/0082874 A1 | 4/2010 | Baba et al. | |
| 2010/0115174 A1 | 5/2010 | Akyol et al. | |
| 2010/0232443 A1 | 9/2010 | Pandey | |
| 2011/0029695 A1 | 2/2011 | Kishore et al. | |
| 2011/0055433 A1 | 3/2011 | Kishore et al. | |
| 2011/0119423 A1 | 5/2011 | Kishore et al. | |
| 2012/0096211 A1 | 4/2012 | Davis et al. | |
| 2012/0166690 A1 | 6/2012 | Regula | |
| 2013/0138836 A1* | 5/2013 | Cohen | H04L 49/351 709/250 |
| 2013/0151685 A1 | 6/2013 | Bursell | |
| 2013/0151750 A1 | 6/2013 | Kanigicherla et al. | |
| 2013/0212440 A1* | 8/2013 | Rom | G06F 11/0709 714/47.1 |
| 2014/0189173 A1 | 7/2014 | Folco et al. | |
| 2015/0156124 A1* | 6/2015 | Tsuji | H04L 47/20 370/230 |

FOREIGN PATENT DOCUMENTS

| | | |
|---|---|---|
| CN | 101765176 A | 6/2010 |
| JP | 2010039729 A | 2/2010 |

OTHER PUBLICATIONS

"Cisco IOS IP Addressing Services Command Reference", Cisco Systems, Inc., 2013.
Krause et al., "I/O Virtualization and Sharing", 2007 PCI-SIG Technology seminar Feb. 26, 2007, http://www.pcisig.com/events/february_seminar; pp. 1-53.
List of IBM Patents or Patent Applications Treated as Related dated Mar. 8, 2016, 2 pages.
PCT International Search Report (PCT/ISA/210) dated Apr. 3, 2014, PCT Notification of Transmittal of the International Search Report and the Written Opinion of the International Searching Authority or the Declaration (PCT/ISA/220), and the PCT Written Opinion of the International Searching Authority (PCT/ISA/237), International Application No. PCT/CN2014/070008, 11 pages.
"PC/1520 Implementation Guide", Texas Instruments, Application Report, SCPA033, Section 6.3, http://www.ti.com/lit/an/scpa033/scpa033.pdf, Oct. 2002, p. 8.
Sabhanatarajan, Karthikeyan et al., "Smart-NICs: Power Proxying for Reduced Power Consumption in Network Edge Devices", Symposium on VLSI, 2008 (ISVLSI'08), IEEE, Apr. 7-9, 2008, 6 pages.
Sohan, Ripduman, et al., "Characterizing 10 Gbps Network Interface Energy Consumption", University of Cambridge, Technical Report No. 784, http://www.cl.cam.ac.uk/~acr31/pubs/sohan-10gbpower.pdf, Jul. 2010, 10 pages.
Suzuki, J., et al., "Multi-root Share of Single-Root I/O Virtualization (SR-IOV) Compliant PCI Express Device", 2010 IEEE 18th Annual Symposium on High Performance Interconnects (HOTI), Mountain View, California, Aug. 18-20, 2010, pp. 25-31, Abstract only, 1 page.
Office Action dated Nov. 17, 2016 received in U.S. Appl. No. 14/486,438, 33 pages.

\* cited by examiner

1000

| CONNECTION | PHYSICAL MACHINE | EXTERNAL ADDRESS | NIC# |
|---|---|---|---|
| 1 | 3 | 10.0.20.2 | 4 |
| 2 | 2 | 10.0.20.30 | 1 |
| 3 | 4 | 10.0.20.13 | 2 |

TABLE 1: EXAMPLE OF INITIAL STATE OF THE TRANSLATION TABLE

TABLE 2 PRESENTS THE NEW STATE OF THE TRANSLATION TABLE, IN A SITUATION WHEN NIC#4 IS SUSPENDED

1010

| CONNECTION | PHYSICAL MACHINE | EXTERNAL ADDRESS | NIC# |
|---|---|---|---|
| 1 | 3 | 10.0.20.2 | 3 |
| 2 | 2 | 10.0.20.30 | 1 |
| 3 | 4 | 10.0.20.13 | 2 |

TABLE 2: TABLE ENTRY UPDATE AFTER NIC#4 ENTERED IN STAND-BY-MODE

FIG. 10

EFFICIENT AND SCALABLE SYSTEM AND COMPUTER PROGRAM PRODUCT FOR HANDLING RX PACKET ON A MR-IOV ARRAY OF NICS

CROSS REFERENCE TO RELATED APPLICATION

This application is a continuation-in-part of U.S. patent application Ser. No. 13/733,542, filed Jan. 3, 2013 the entire content and disclosure of which is incorporated herein by reference.

BACKGROUND

This disclosure is generally related to networks, including network I/O (Input/Output) devices, and more particularly to a operating of one or more network cards providing I/O.

BACKGROUND OF THE INVENTION

A network card refers to an electronic device that connects a computing system to a network. MR-IOV (Multi-Root I/O Virtualization) refers to a technology that enables network devices to be shared by computing systems and operating systems of computing systems. In a current MR-IOV network system, data packets directed to a network card are dropped if a throughput of that network card of the corresponding computing system(s) exceeds a pre-determined threshold. The dropping of data packets may render data incomplete or unusable or unreliable in the current MR-IOV network system due to loss of the dropped data packets.

SUMMARY

A system and a computer program product may be provided for operating one or more network cards connected to one or more computing systems and connected to one or more networks. The computing systems detect resource utilization of all network cards of physical servers connected via one or more networks. The computing systems monitor network statistics of the network. The computing systems determine an operation of each network card connected to the network according to the monitored network statistics.

BRIEF DESCRIPTION OF THE DRAWINGS

These and other objects, features and advantages of the present invention will become apparent from the following detailed description of illustrative embodiments thereof, which is to be read in connection with the accompanying drawings, in which:

FIG. 10 illustrates an exemplary translation table in one embodiment;

DETAILED DESCRIPTION

Figure 1:
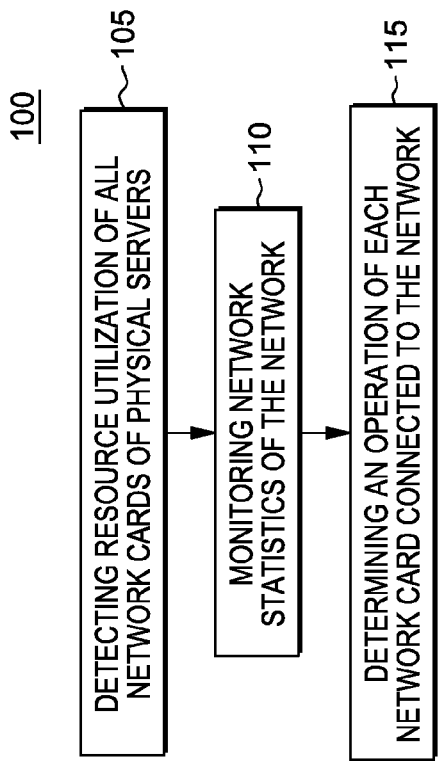
FIG. 1 illustrates a flowchart that describes method steps for operating network cards in one embodiment.

This disclosure describes that a scalable mechanism in a network system in which packets are received from an external network(s) via one or more network switches with destination addresses set to the IP (Internet Protocol) addresses of network cards that have been suspended, e.g., by using network address aliasing. The network address aliasing enables one or more active network cards to receive those packets directed to the suspended network card. FIG. 1 illustrates method steps for efficiently operating network cards connecting network communications infrastructures to computer servers or like devices. Operation of a network card includes, but is not limited to: connecting a computing system to one or more other networks; allowing a computing system to exchange data with other computing systems; activating the network card; de-activating the network card, etc. At 105, computing systems, e.g., physical servers, etc., detects resource utilization (for example, network communication bandwidth in hertz) of all network cards of computing systems connected via one or more networks. At 110, each physical server monitors network statistics of the network. At 115, the computing systems determine an operation of each network card connected to the network according to the monitored network statistics. Monitoring the network statistics include, but are not limited to: detecting throughput of all network cards; and evaluating whether a resource utilization of each network card is larger or lower than a threshold (e.g., using of more than 80% of bandwidth of the each network card, etc.). This threshold may be dynamically changed by the computing systems. The computing system may determine that a network card is idle if resource utilization of that network card is lower than the threshold.

Each computing system enables a network card to handle data flow transparently through impersonation, i.e., de-activating one or more network cards whose resource utilization is lower than a threshold. The computing system(s) that are connected to each other via one or more networks disconnect idle network cards because there exists not enough data throughput (e.g., data throughput lower than the threshold, etc.) in the idle network cards.

Figure 2:
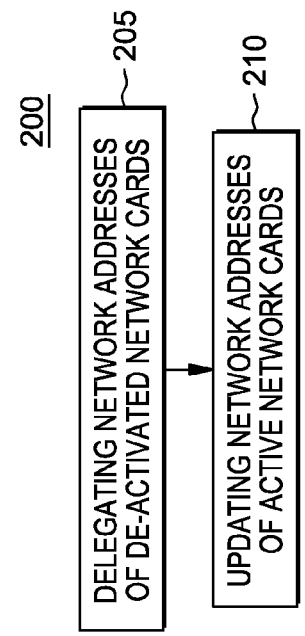
FIG. 2 illustrates a flow chart that describes method steps for updating network addresses of active network cards in one embodiment.
Figure 8:
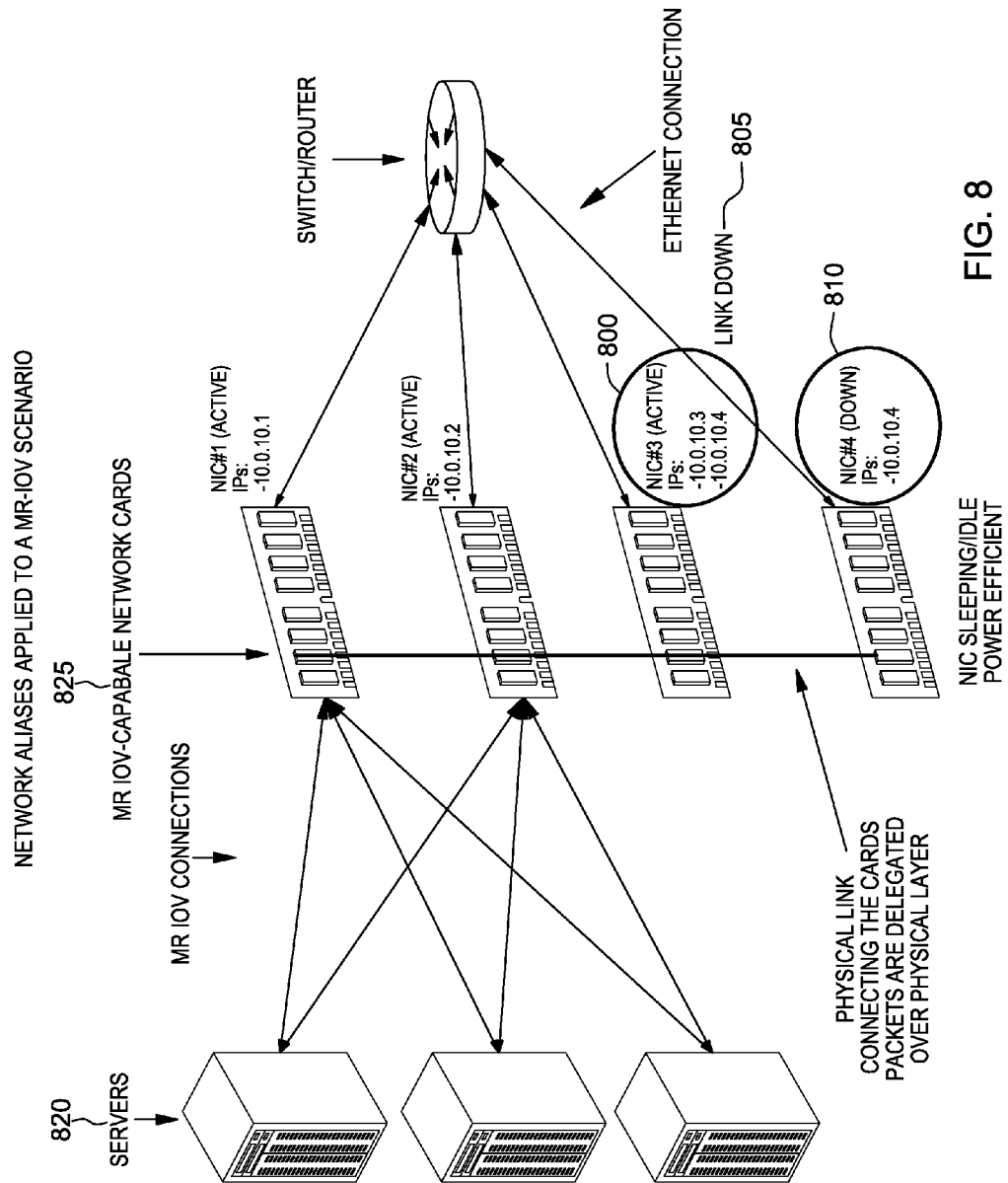
FIG. 8 illustrates an exemplary MR-IOV network system in one embodiment.

FIG. 2 illustrates a flow chart that describes method steps for creating one or more network alias addresses after determining that one or more network cards are idle. The computing system(s) de-activates network cards whose resource utilization is lower than a threshold, e.g., by discontinuing power flow or by not providing an electric power to those network card(s). At 205, the computing system(s) delegate network addresses of de-activated network cards to active network cards, e.g., by creating network address alias of the de-activated network cards and further by using the created network address alias in the active network cards. At 210, the computing system updates network addresses of active network cards, e.g., by the network addresses of the active network cards to include the created network alias in the active network cards. FIG. 8 illustrates an exemplary network address alias, e.g., 10.0.10.4, which is a network address of a de-activated network card 810. According to FIG. 8, one or more computing systems 820 use one or more network cards 825 by using MR-IOV technology 815 that enables sharing of those network cards 825 among those computing systems 820. A network connection 805 between the de-activated network card 810 and a network switch becomes disconnected because a throughput of the de-activated network card 810 is lower than a threshold. This exemplary network address alias is used by the active network card 800. The active network card 800 can receive data packets directed to the exemplary network address alias. The active network card 800 can also send data packets with the exemplary network address alias.

Figure 3:
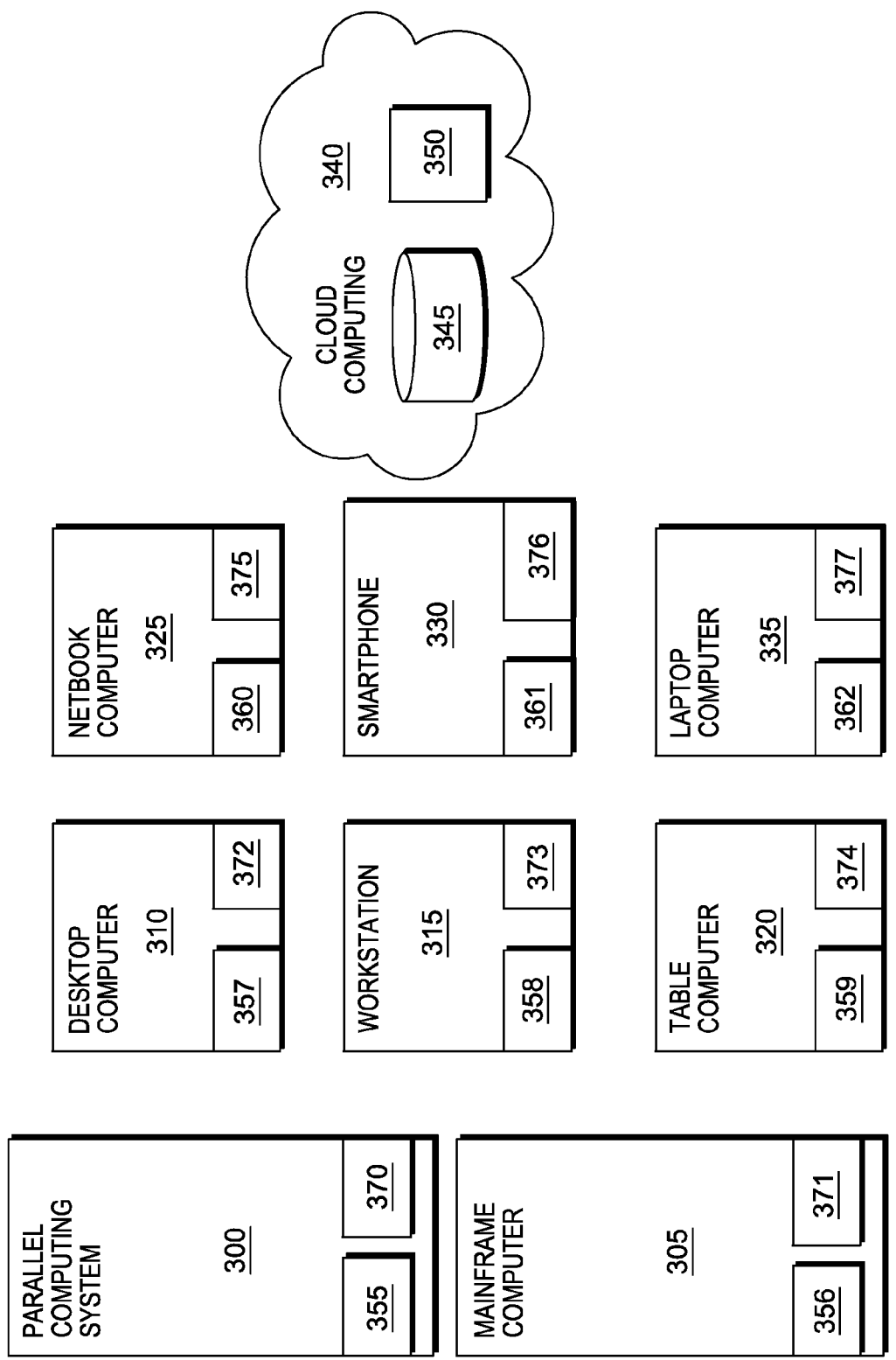
FIG. 3 illustrates exemplary hardware configurations of a computing system in one embodiment.

FIG. 3 illustrates examples of the computing system that run method steps shown in FIGS. 1-2. An example computing system may include, but are not limited to: a parallel computing system 300 including at least one processor 355 and at least one memory device 370, a mainframe computer 305 including at least one processor 356 and at least one memory device 371, a desktop computer 310 including at least one processor 357 and at least one memory device 372, a workstation 315 including at least one processor 358 and at least one memory device 373, a tablet computer 320 including at least one processor 356 and at least one memory device 374, a netbook computer 325 including at least one processor 360 and at least one memory device 375, a smartphone 330 including at least one processor 361 and at least one memory device 376, a laptop computer 335 including at least one processor 362 and at least one memory device 377, or a cloud computing system 340 including at least one storage device 345 and at least one server device 350. These computing systems may be connected each other via one or more networks (not shown in FIG. 3).

Figure 4:
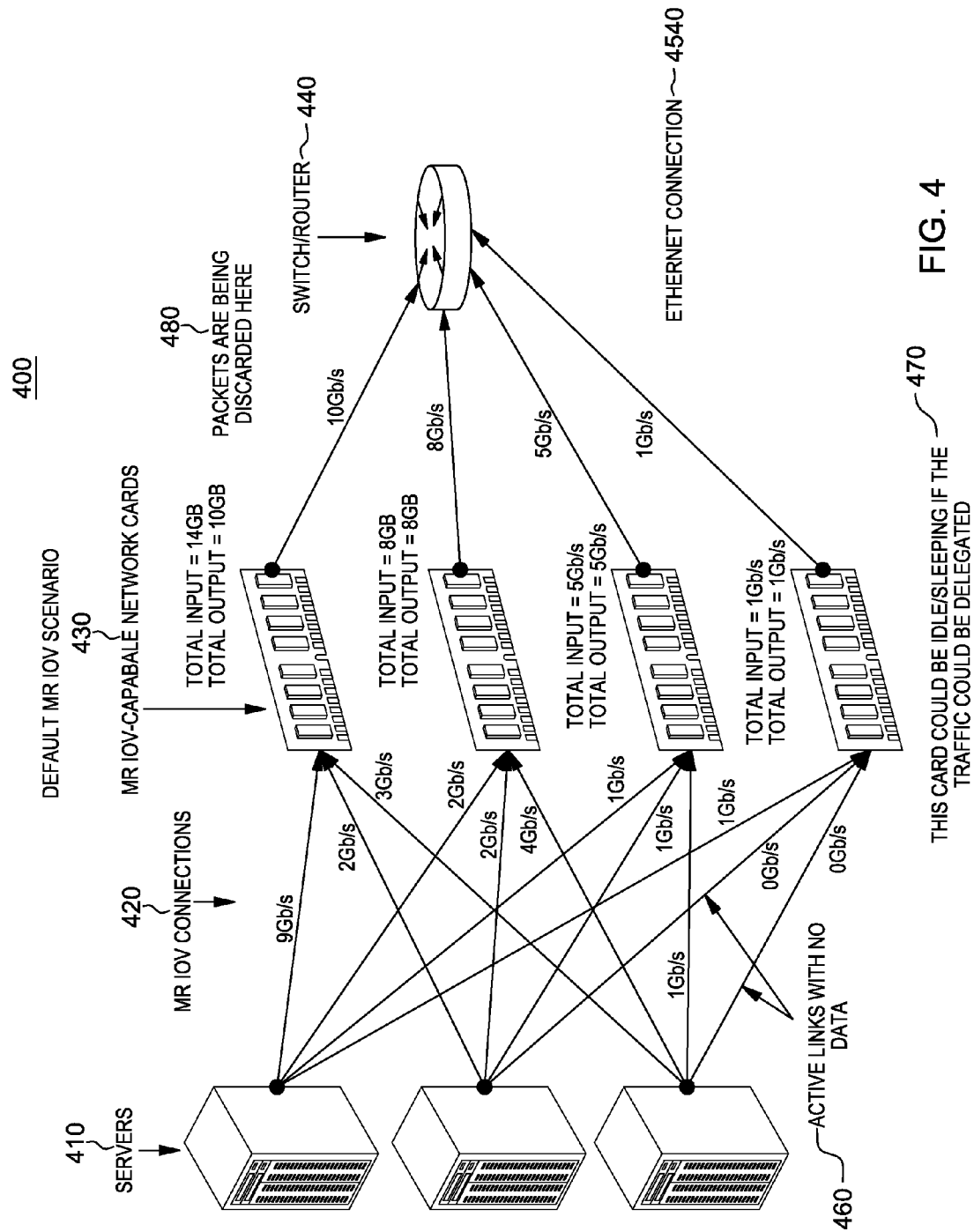
FIG. 4 illustrates an exemplary MR-IOV network operation in one embodiment.

FIG. 4 illustrates an exemplary network configuration in one embodiment. In this exemplary network configuration 400, there are a plurality of physical servers 410. These physical servers 410 are connected via connections/links 420 to each MR-IOV network cards 430 (i.e., network cards that utilizes MR-IOV technology). The physical servers 410 via their respective network card 470 each communicate with switches or routers 440 via a respective Ethernet connection 450. In a period of time, an active link may deliver no data from one or more physical servers to a network card 470, and the link and card 470 may become idle, e.g., by not providing an electric power to the idle network card 470. By disconnecting a network connection between the idle network card 470 and the switch and router 440, packets directed to the idle network card may be dropped.

Figure 5:
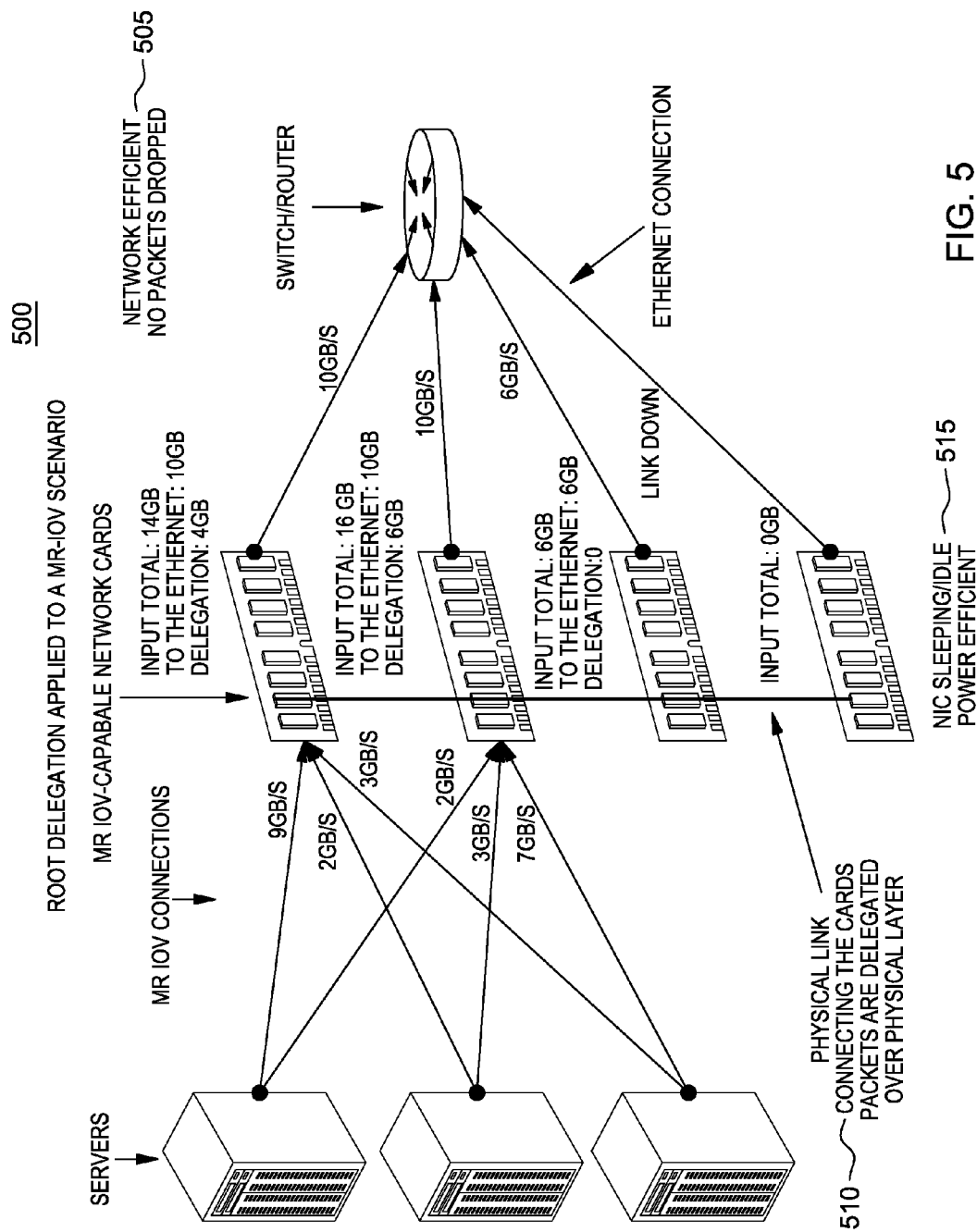
FIG. 5 illustrates an exemplary MR-IOV network operation in one embodiment.

FIG. 5 illustrates an exemplary network configuration 500 in one embodiment. The network cards are connected to each other through a physical link, e.g., an optical wire, etc. If a network card becomes idle, data packets destined for that idle network card are processed by other active network card(s). Because at least one network card whose resource utilization is less than a threshold becomes idle or in sleep mode (i.e., operating network card(s) while consuming lowest electric power, etc.), the network configuration 500 becomes power efficient, i.e., saves electric power consumed to operate the network configuration. Since other active network cards process packets directed to the idle network card(s), no data packets are dropped 505. Because no data packets are dropped, this network configuration 500 provides better QoS (Quality of Service).

Before entering the sleep mode, the idle network cards (also called network card to be de-activated) delegate tasks (e.g., receiving data packet(s) from an external network, etc.). The delegation of the tasks includes, but is not limited to: (1) delegating of network addresses of the de-activated network cards to active network cards (i.e., creating of network address alias of network address of the de-activated network cards and enabling one or more active network cards to use the created network address alias when sending or receiving data packets); and (2) updating network addresses of the active network cards in order for the network addresses of the active network cards to include the delegated network addresses of the de-activated network cards.

A network connection and configuration, e.g., network connection and configuration 500 shown in FIG. 5, which activates or de-activates network cards is stable: no data packets are dropped. In one embodiment, de-activated network cards may become activated when throughput of currently operating network cards is insufficient to process data packets to be sent and received. The network connection and configuration 500 is scalable due to one or more of: (1) de-activated network cards become activated or additional network cards can be added to the network 500 and activated in order to increase throughput of activated network cards; (2) currently activated network cards can be de-activated when their throughput is lower than a threshold; and (3) a network card connected to the network connection and configuration 500 can become uninstalled.

In one embodiment, no data packet is dropped in the network 500 because data packets to be processed by the network card whose resource utilization is larger than the threshold are processed by the activated network cards.

Figure 12:
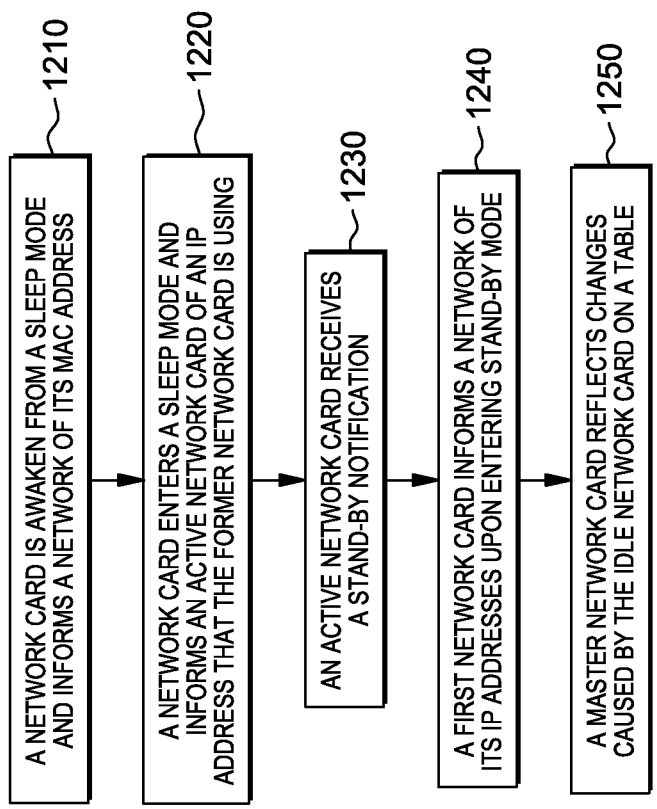
FIG. 12 illustrates a flowchart that describes method steps for operating a network by enabling and suspending one or more network cards in one embodiment.

The network configuration 500 operates as shown in method steps of FIG. 12: At 1210, when a network card is awaken from a sleep mode or a low power mode, the network card informs the network 500 that its MAC (Media Access Control) address responds for an specific IP address and will start exchanging packets with the network. MAC address refers to a unique identifier assigned to a device connected to a network. At 1220, when a network card enters in stand-by mode, i.e., sleep mode, the network card entering the stand-by-mode informs an active network card about the IP address that the former network card was using.

At 1230, when an active network card receives a stand-by notification from a next network card along with the IP address that the next network card was using, the former active network card creates a network address alias. In order to create the network address alias, the active network card associates the active network card with one or more network addresses, i.e., IP address(es) currently used by the active network card and the IP address of the next network card, e.g., by using a table that maps the network card(s) to corresponding IP addresses. The created network address alias enables the active network card to respond and to use the one or more network addresses. After creating the network address alias, the active network card informs the network that its MAC address will also be responding for the next network card's IP address. The stand-by notification refers to a notification sent from an idle network card to inform other network cards that the idle network card no longer process data packets and the idle network card stops its operation. Upon sending the stand-by notification, the idle network card suspends all the operation(s) performed by the idle network card.

At 1240, a first network card that uses more than one IP address when entering in the stand-by mode informs an active network of all IP addresses that the first network card is using. At 1250, to handle changes caused by network cards which become idle or active, a master network card integrates a translation table that indicates network routes of returning packets to a correct computing system(s).

Figure 6:
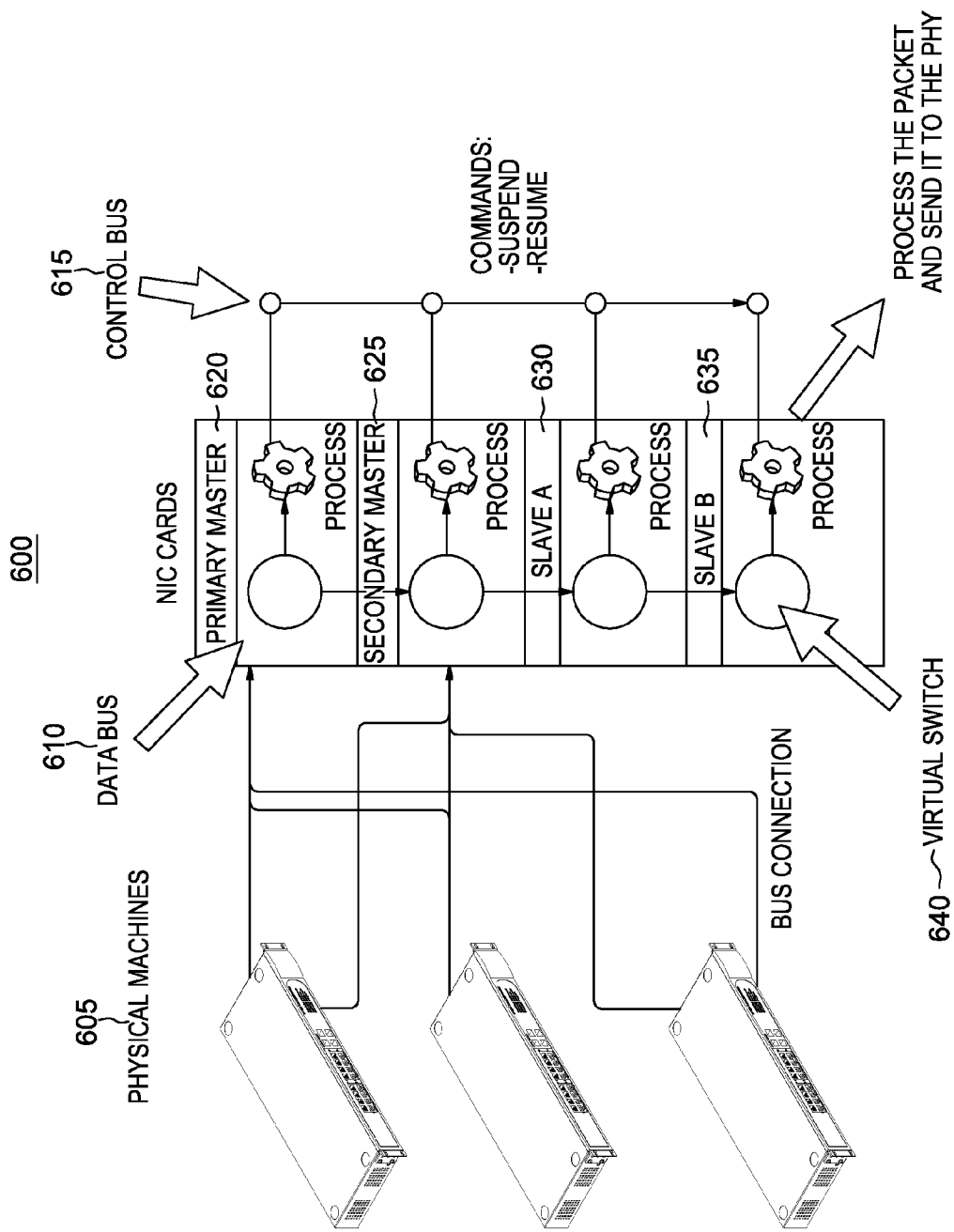
FIG. 6 illustrates an exemplary data bus and control bus in one embodiment.
Figure 9:
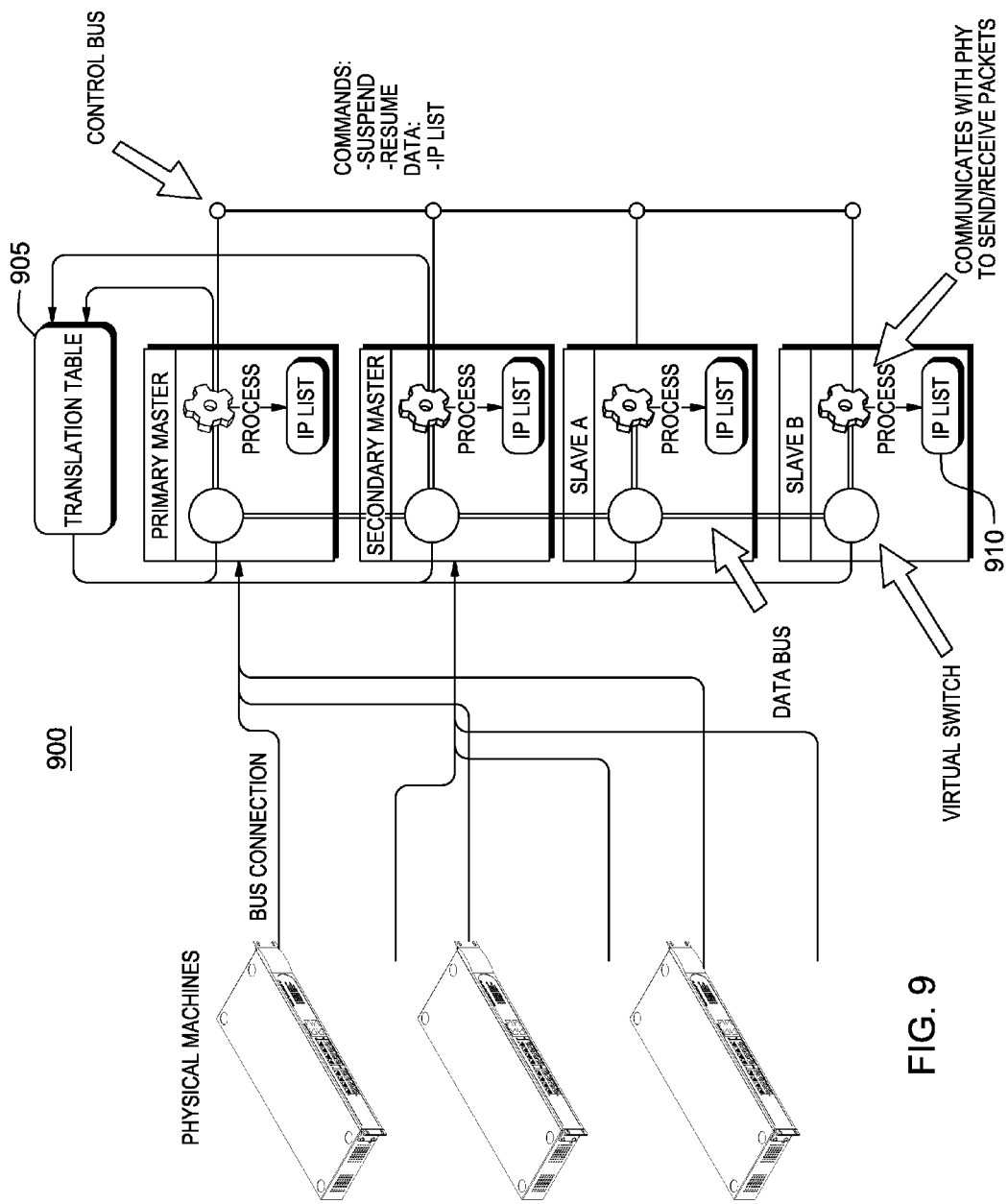
FIG. 9 illustrates an exemplary translation list and an exemplary IP list in one embodiment.

FIG. 6 illustrates an exemplary network configuration 600 in one embodiment. In this exemplary network configuration 600, computing system(s) 605 are connected to network cards via a communication line or network, e.g., bus connection—a data bus 610 and a control bus 615. Via the data bus 610 and the control bus 615, the computing system(s) 605 send and receive data packets from network cards, which include, but are not limited to: (1) a primary master network card 620, (2) a secondary master network card 625, (3) a slave network card 630, (4) another slave network card 635. The primary master network card 620 stores, e.g., in a memory device (not shown), a translation table 905 shown in FIG. 9 that is accessible by all network cards, and indicates one or more of: (1) which network cards become de-activated or become activated; network routes to deliver data packets to correct destination(s) via currently activated network cards. The translation table maps each computing system to a network address and to a network card. The translation table indicates currently active network cards.

The translation table is updated whenever a list of IP addresses of a de-activated network card are included in a list of IP addresses of a currently active network card. The translation table keeps track of all network connections between computing systems and currently active network cards. The translation table 1000 shown in FIG. 10 depicts that a network card #4 is responding to a network address of 10.0.20.2. The translation table 1010 shown in FIG. 10 depicts that a network card #3, not a network card #4, is responding to a network address of 10.0.20.2, because the network card #4 becomes de-activated. In one embodiment, network card #4 may have become de-activated, e.g., by receiving a SUSPEND signal from computing system(s). Network address aliases reflected in the translation table enables network cards to be de-activated.

When a data packet is sent to a network by a network card, a virtual switch of that network card masks this data packet, e.g., by mask bits, and sends only the header information to the primary network card. The primary network card determines, based on the translation table, which network card(s) is connected or installed to a destination computing system(s). In an event of a first active network card being de-activated, a second active network card receives the packets sent to the first active network card. The primary network card monitors the control bus waiting for IP delegation messages and updates the table to route the incoming packets to the correct physical machine. IP delegation messages refer to messages that include network addresses of de-activated network cards and to request one or more currently active network cards to include the network addresses of the de-activated network card in the IP address list of the one or more currently active network card.

When an additional network card is activated on a network by receiving a "RESUME" signal over the control bus, the activated additional network card proceeds with two actions: (1) record its IP (Internet Protocol) address that the additional network card uses in an IP list 910 that lists IP addresses that the additional network card uses; (2) send an ARP (Address Resolution Protocol) messages that include MAC address and IP address of the additional network card. This ARP message announces to network switches and all other devices connected to the network, e.g., the network 900 shown in FIG. 9, which this network card is responding for the IP addresses of the IP list. The additional network card also responds to all ARP request messages whose recipient is the additional network card.

The second master network card 625 is a backup network card which perform the tasks, e.g., managing the translation table 905. The second master network card 625 operate when the primary network card loses electric power or when the throughput of the primary secondary network card is higher than a threshold. Other network cards become de-activated (i.e., suspended) or activated (i.e., resumed) via a signal received from computing system(s) through a control bus 615. The network cards process and transfer the data packets to one or more external network(s) or one or more computing system(s). A virtual switch 640 transmits data packets to network cards from the one or more external network(s) or one or more computing system(s) or peripherals. Each network card may also store a list of IP addresses that are used by the each network address.

Primary network card(s) may determine a destination of each data packet, e.g., based on header information of the each data packet. Primary network card(s) sends a data packet, which is directed to the network card whose resource utilization is larger than a threshold, to the one or more activated network cards. The activated network cards share a network address of the network card whose resource utilization is larger than the threshold.

When a first network card receives a "SUSPEND" signal, the first network card stops responding for the packets destined to IP addresses listed in its IP list. At this point, the first network card proceed with a following single action: send over the control bus a message to a currently active network card the IP addresses of the first network card. Then, the currently active network card proceed with two actions: (1) add a network address of the first network card to the IP List of the currently active network card; and (2) create a network address alias of the first network card and sending an ARP message (i.e., a message by using Address Resolution Protocol (ARP)) to inform devices connected to the network that the currently active network card responds to the IP address of the first network card. The currently active network card continue to respond to its IP addresses that have been listed in its IP address list.

When the currently active network card receives a "SUSPEND" signal, the currently active network card ("second network card") stops responding for the packets destined to its (a) IP addresses listed in its IP address list and to (b) IP address of the first network card. At this point, the second network card proceeds with a following action: send over the control bus a message to another currently active network card. The message includes all the IP addresses the second network card is responsible for. The another currently active network card proceeds with two actions: (1) add the IP address of the first network card and the IP addresses listed in its IP address list of the second network card to the IP list of the another currently active network card; and (2) create network address aliases of network addresses listed in the IP list of the second network card and inform that the another currently active network card is responding for the IP addresses of the first network card and the IP addresses of the second network card. The another active network card continuously responds to the IP addresses listed in its IP address list. This delegation of network cards can continue until only the primary master and secondary master NIC's are activated and currently active network cards process data packets directed to the IP addresses of all the de-activated network cards.

Figure 7A:
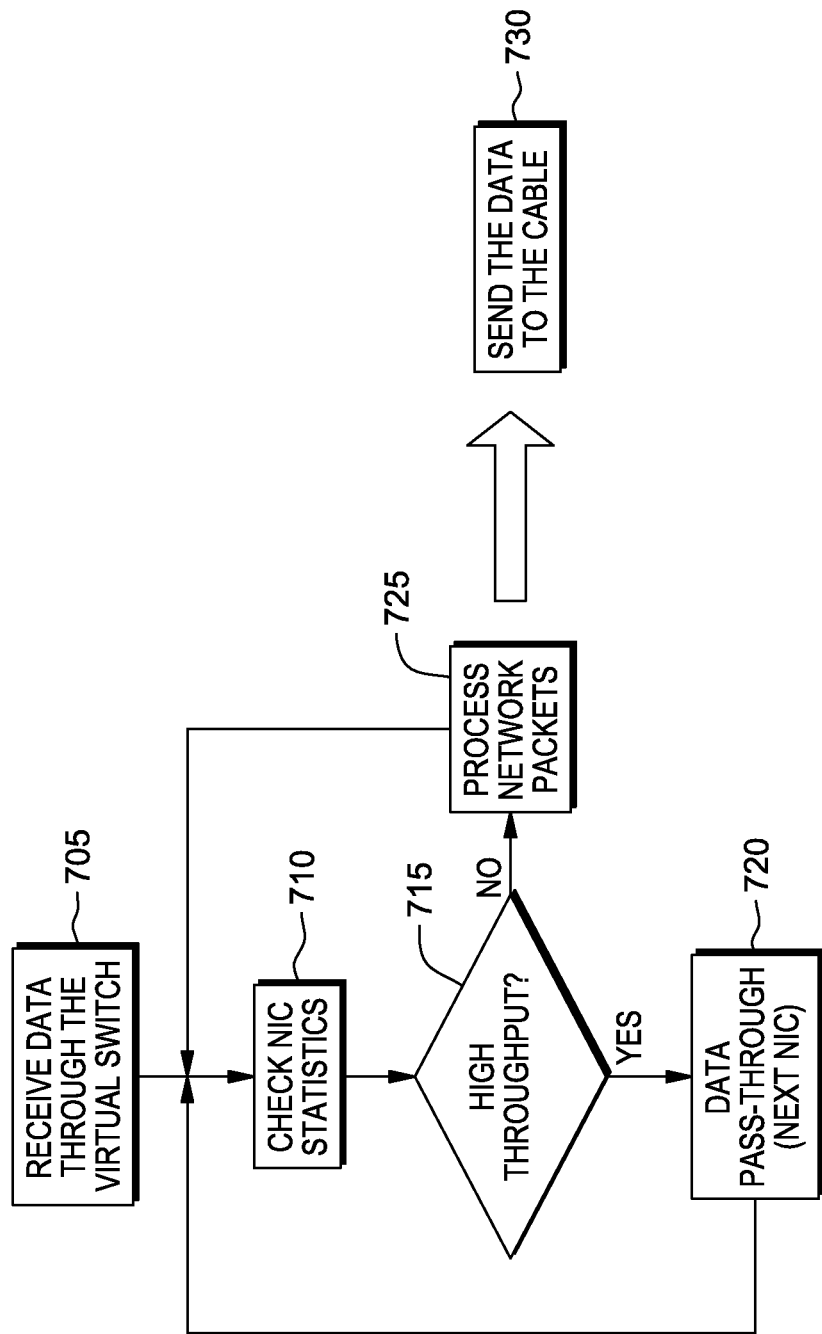
FIG. 7A illustrates a flowchart that describes method steps performed in MR-IOV network system in one embodiment.

FIG. 7A illustrates a flowchart that describes method steps for processing data packets in MR-IOV network. At 705, a network card receives data packets through a virtual switch. At 710, a primary network card connected to the network card evaluates resource utilization statistics of other network cards. At 715, the primary network card evaluates whether a throughput of each other network card is higher than a threshold. At 725, if a throughput of a corresponding network card is less than the threshold, the corresponding network card processes data packets. At 730, the corresponding network card sends the processed data packet to an external network. At 720, if the throughput of the corresponding network card is greater than the threshold, the corresponding network card transfers the data packets to an active network card, e.g., via an electric wire, optic wire, etc.

Figure 7B:
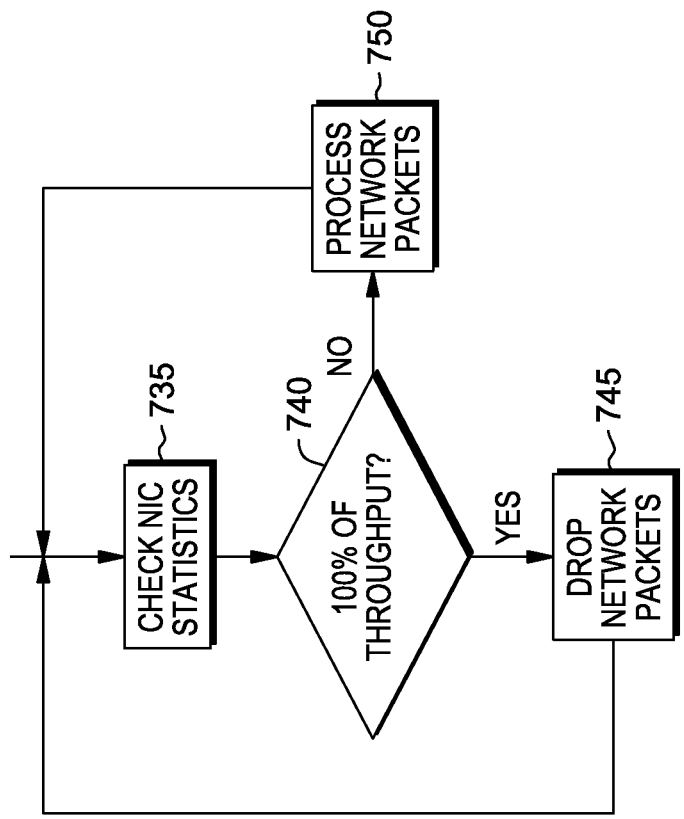
FIG. 7B illustrates a flowchart that describes method steps performed in MR-IOV network system in one embodiment.

In another embodiment shown in FIG. 7B, at 735, one or more computing systems evaluate resource utilizations or throughputs of every network card connected to the one or more computing systems. At 740, the one or more computing systems evaluates whether a current throughput of each network card is the maximum throughput of the each network card. At 750, the each network card processes data packets destined to the each network card. At 745, if the current throughput of the each network card is more than the maximum throughput of the each network card, the each network card drops data packets destined to the each network card without processing the data packets to be dropped.

Figure 11:
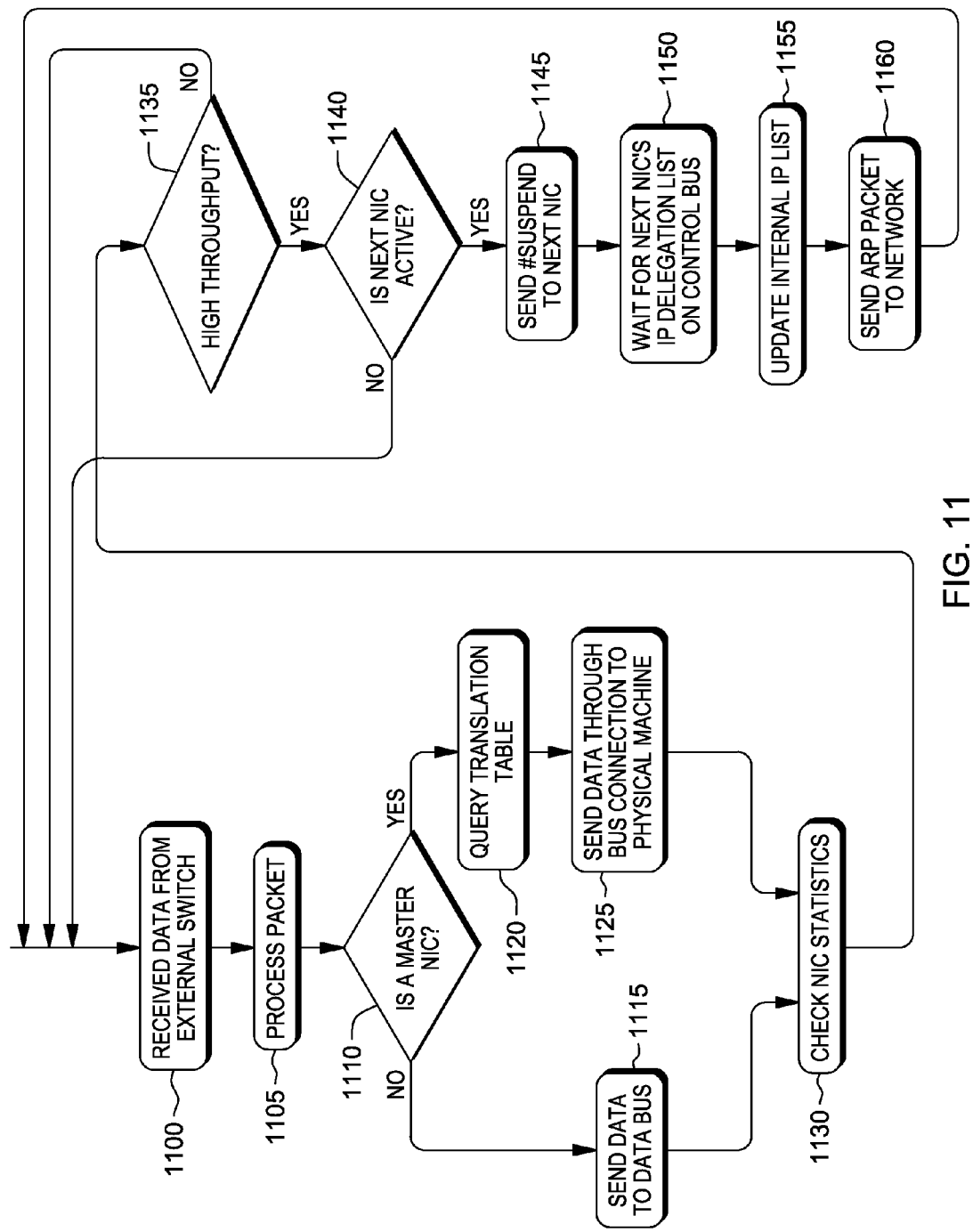
FIG. 11 illustrates a flowchart that describes method steps for operating an MR-IOV network system in one embodiment.

FIG. 11 illustrates a flowchart that describes method steps for operating an MR-IOV network system in one embodiment. At 1100, the computing system(s) receives data packets from an external network. At 1105, the computing system(s) process the received data packets. At 1110, the computing system(s) evaluates whether a corresponding network card is a primary network card. At 1115, if the corresponding network card is the primary network card, the computing system(s) send the received data packets to a data bus. At 1125, if the corresponding network card is the primary network card, the primary network card accesses the translation table and determines one or more network cards which are destinations or intermediary destinations of the received data packets. The primary network card sends the received data to the destinations or intermediary destinations. At 1130, the computing system(s) check network statistics of network cards connected to a corresponding network. At 1135, the computing system(s) evaluates whether the throughput of a corresponding network card is higher than a threshold. At 1135, if the throughput of the corresponding network card is less than the threshold, the computing system(s) continuously receive the data packets from an external switch. At 1140, the throughput of the corresponding network card is higher than or equal to the threshold, the computing system(s) evaluates whether there exists one or more active network cards. At 1145, the computing system(s) sends a "SUSPEND" signal to the corresponding network card. At 1150, the corresponding network card sends an IP delegation message to the one or more active network cards over the control bus. The IP delegation message may request the IP address lists of the one or more network cards to include the network address(es) of the corresponding network card. At 1155, the one or more network cards update their IP address lists to include the network address(es) of the corresponding network card. After updating those IP address lists, the one or more active network cards send an ARP message to the primary network card in order to update the translation table. The update of the translation table may reflect that the corresponding network card is no longer processes data packets and further reflect that the one or more active network cards process data packets destined to the corresponding network card.

ARP messages may be static or dynamic, but except for network core infrastructure (backbone, a series of switches, etc.). ARP messages may include dynamic entries with pre-set timeout for the entries. For example, one or more entries in the ARP message may disappear after a particular time-out. In one embodiment, ARP messages entries may be manipulated, e.g., by modifying data of ARP messages through a wireless communication. In one embodiment, packet collisions (i.e., colliding of data packets due to a high rate of data packets being created or transferred) may be avoided, e.g., by preventing network cards to be suspended and to be activated too quickly, e.g., less than 10 seconds after the suspension, in case that a network resource utilization suffers from severe peaks. For example, the computing system(s) keep track of timestamps of the moments a network card is activated and may not suspend that network card in less than a given time from the activation. By delaying the activation of the suspended network card, the computing system(s) may delay responding e.g., by taking more than 10 seconds from the suspension of a network card to the activation of that network card, to a network resource utilization peak and therefore may obviate overloading the network switches with ARP messages and/or data packets. In another embodiment, the computing system(s) may respond, within less than a particular time period, to a network utilization peak and may prevent overloading the network switches with ARP messages.

In one embodiment, the methods shown in FIGS. 1-2 and 11 may be implemented as hardware on a reconfigurable hardware, e.g., FPGA (Field Programmable Gate Array) or CPLD (Complex Programmable Logic Device), by using a hardware description language (Verilog, VHDL, Handel-C, or System C). In another embodiment, the methods shown in FIGS. 1 and 3-4 may be implemented on a semiconductor chip, e.g., ASIC (Application-Specific Integrated Circuit), by using a semi custom design methodology, i.e., designing a semiconductor chip using standard cells and a hardware description language.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by a device that runs an instruction. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may run the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which run on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system for operating network cards, the system comprising:
   a memory device; and
   a processor coupled to the memory device,
   wherein the processor is configured to perform:
      detecting resource utilization of a plurality of network cards of computing systems connected via one or more networks;
      monitoring network statistics of the one or more networks, the monitoring the network statistics including: evaluating whether a resource utilization of each of the plurality of network cards connected to the one or more networks is larger than a threshold; and
      determining an operation of each of the plurality of network cards connected to the one or more networks according to the detected resource utilization and the monitored network statistics,
   wherein at least one of the plurality of network cards is shared by at least two of the computing systems,
   wherein in order to determine the operation of the each of the network cards, the processor is further configured to perform:
      de-activating a third network card of the plurality of network cards; and
      informing other at least one active network card of one or more network addresses of the third network card, wherein the resource utilization of the third network card is lower than the threshold.

2. The system according to claim 1, wherein in order to determine the operation of the each of the network cards, the processor is further configured to perform:
    activating a first network card of the plurality of network cards in response to determining that a resource utilization of currently operating one or more network cards of the plurality of network cards is larger than the threshold, wherein the first network card has been inactive.

3. The system according to claim 2, whereby no data packet is dropped in the one or more networks because data packets to be processed by the currently operating one or more network cards whose resource utilization is larger than the threshold are processed by the activated first network card.

4. The system according to claim 1, wherein in order to de-activate the third network card, the processor is further configured to perform:
    delegating tasks performed by the de-activated third network card to said other at least one active network card of the plurality of network cards.

5. The system according to claim 4, wherein in order to delegating the tasks, the processor is further configured to perform:
    delegating the one or more network addresses of the de-activated third network card to said other at least one active network card of the plurality of network cards;
    updating one or more network addresses of said other at least one active network card to include the delegated one or more network addresses of the de-activated third network card.

6. The system according to claim 1, wherein in order to monitor the network statistics, the processor is further configured to perform:
    detecting throughput of the plurality of network cards.

7. The system according to claim 1, wherein the at least one of the plurality of network cards uses a multi-root I/O virtualization (MR-IOV) technology.

8. A computer program product for operating network cards, the computer program product comprising a non-transitory computer readable storage medium, the non-transitory computer readable storage medium readable by a processing circuit and storing program instructions run by the processing circuit for performing a method, said method steps comprising:
    detecting resource utilization of a plurality of network cards of computing systems connected via one or more networks;
    monitoring network statistics of the one or more networks, the monitoring the network statistics including:
        evaluating whether a resource utilization of each of the plurality of network cards connected to the one or more networks is larger than a threshold; and
    determining an operation of each of the plurality of network cards connected to the one or more networks according to the detected resource utilization and the monitored network statistics,
    wherein at least one of the plurality of network cards is shared by at least two of the computing systems,
    wherein the determining the operation of the each of the network cards comprises:
    de-activating a third network card of the plurality of network cards; and
    informing other at least one active network card of one or more network addresses of the third network card,
    wherein the resource utilization of the third network card is lower than the threshold.

9. The computer program product according to claim 8, wherein the determining the operation of the each of the plurality of network cards includes:
    activating a first network card of the plurality of network cards in response to determining that a resource utilization of currently operating one or more network cards of the plurality of network cards is larger than the threshold, wherein the first network card has been inactive.

10. The computer program product according to claim 9, whereby no data packet is dropped in the one or more networks because data packets to be processed by the currently operating one or more network cards whose resource utilization is larger than the threshold are processed by the activated first network card.

11. The computer program product according to claim 9, wherein the de-activating the third network card comprises:
    delegating tasks performed by the de-activated third network card to said other at least one active network card of the plurality of network cards.

12. The computer program product according to claim 11, wherein the delegating the tasks comprises:
    delegating the one or more network addresses of the de-activated third network card to said other at least one active network card;
    updating one or more network addresses of said other at least one active network card to include the delegated one or more network addresses of the de-activated third network card.

13. The computer program product according to claim 8, wherein the monitoring the network statistics comprises:
    detecting throughput of the plurality of network cards.

14. The computer program product according to claim 8, wherein the at least one of the plurality of network cards uses a multi-root I/O virtualization (MR-IOV) technology.

* * * * *